June 12, 1951 — H. O. HEDGES — 2,556,273
INTERNAL-COMBUSTION ENGINE CYLINDER LUBRICATION
Filed March 7, 1947 — 3 Sheets-Sheet 1
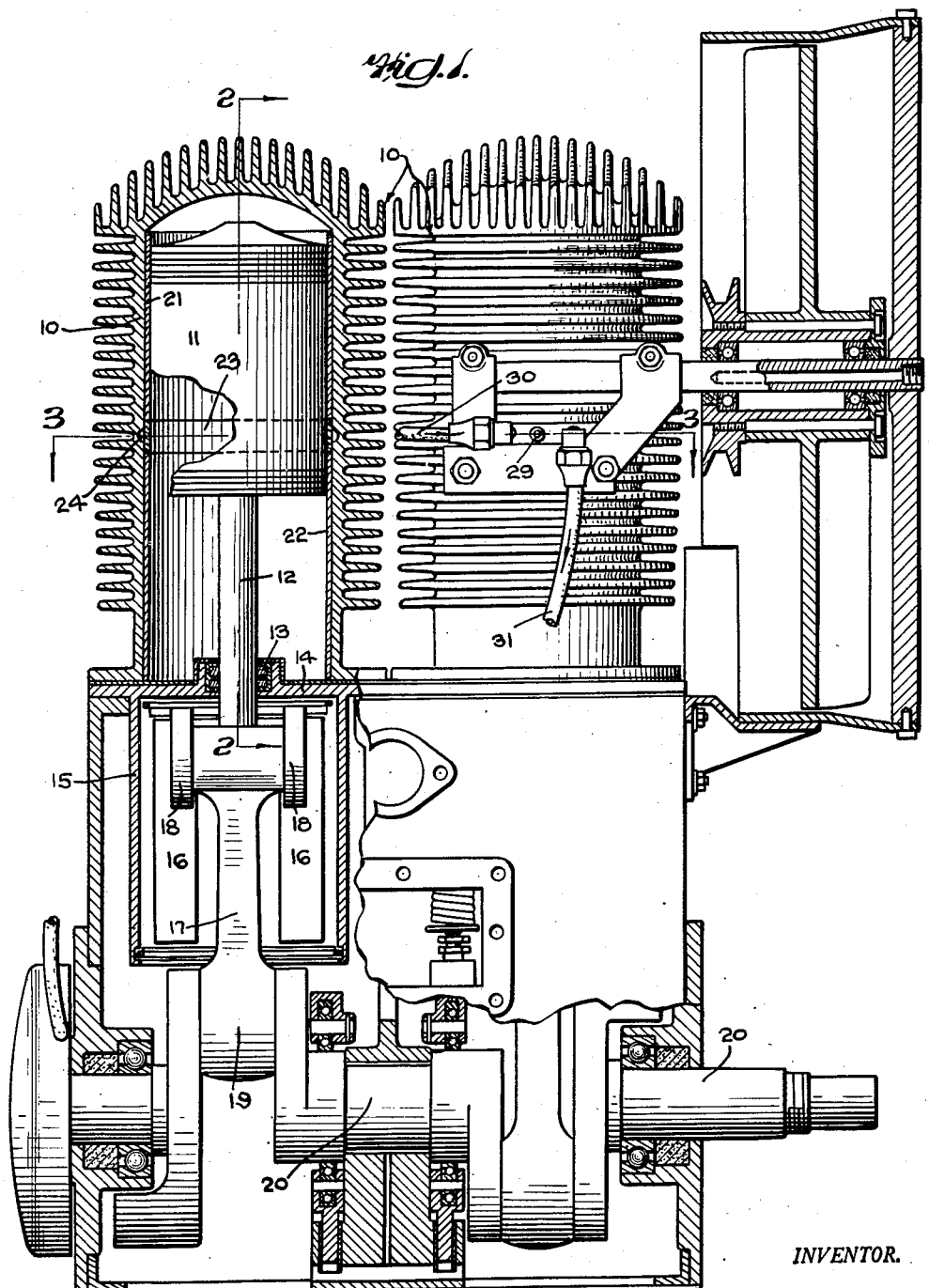
INVENTOR.
HARRY O. HEDGES
BY Leon Edelson
ATTORNEY

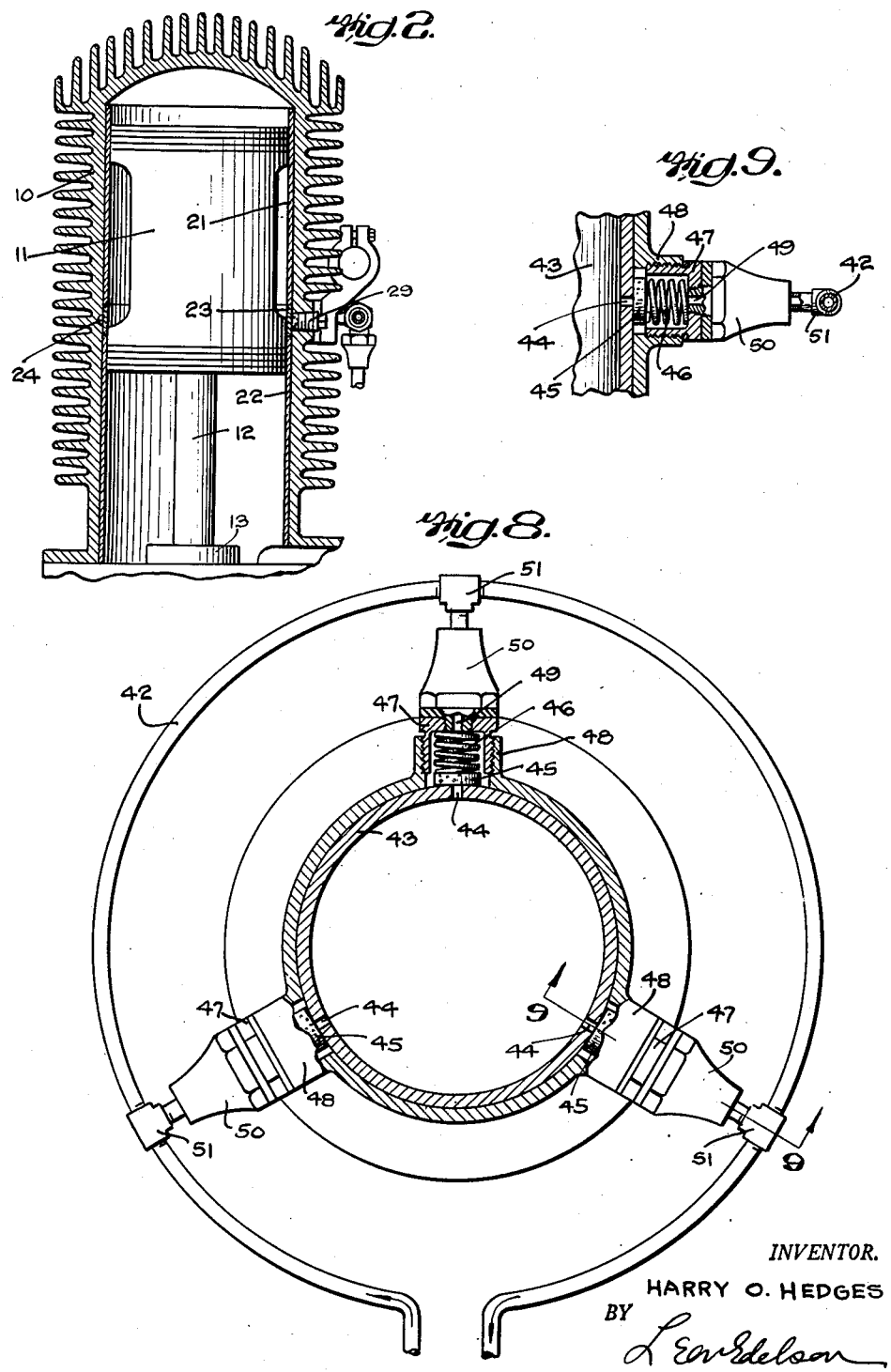

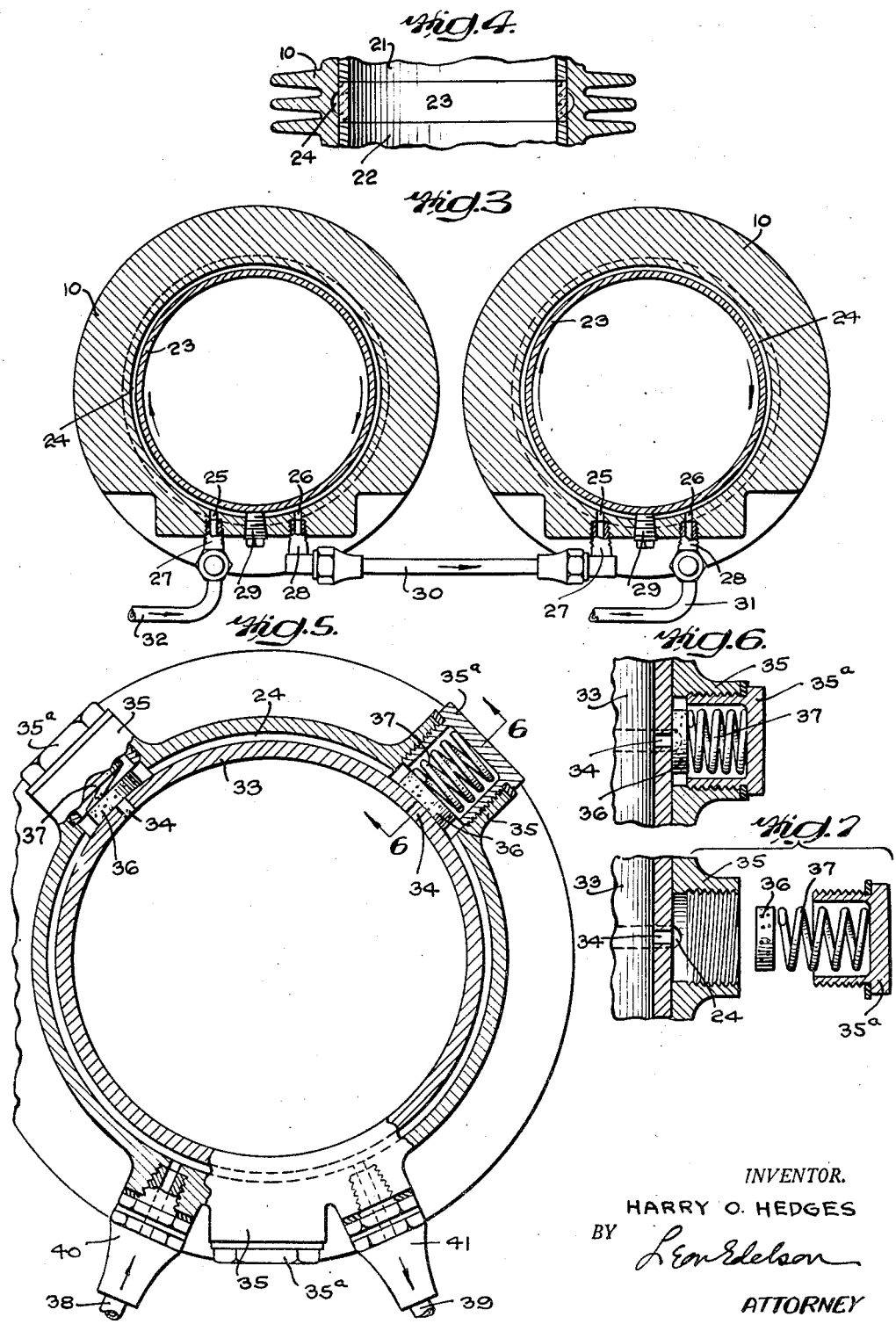

Patented June 12, 1951

2,556,273

UNITED STATES PATENT OFFICE 2,556,273

INTERNAL-COMBUSTION ENGINE CYLINDER LUBRICATION

Harry O. Hedges, Seattle, Wash., assignor to Hedges Motor Company, Seattle, Wash., a corporation of Washington Application March 7, 1947, Serial No. 733,260

5 Claims. (Cl. 184—18)

This invention relates generally to internal combustion engines and more particularly to an improved means for supplying a constant and uniform flow of lubricating oil to the internal wall surface of the piston cylinder to lubricate the piston during its reciprocation within the cylinder, such means being auxiliary to the oil rings conventionally fitted upon the piston.

In accordance with the principles of the present invention, oil from the crankcase of the engine is positively circulated by means of a pump to and from the cylinder wall so as to constantly supply the internal surface thereof with a film of lubricant, the supply of lubricant to such internal surface of the cylinder being always under such constant control as to supply the cylinder wall surface with only so much lubricant as is required to insure the most efficient operation of the engine.

More specifically, it is an object of the present invention to provide the piston cylinder with one or more porous metal filters which permit a limited and closely controlled flow of lubricant therethrough to insure a constant supply of the crankcase lubricant to the internal walls of the cylinder, the supply being sufficient to properly and adequately lubricate the piston during its reciprocatory movement within the cylinder without at the same time fouling the cylinder by supplying it with an excess of oil.

While the present invention is particularly applicable to internal combustion engines of the type designed to operate on the two-stroke cycle principle, it will be understood that it is not intended to be limited to such application inasmuch as it may be employed with equal effect and facility on other types of internal combustion engines wherein it is desired to lubricate the internal wall surfaces of the power cylinder or cylinders of the engine to provide for most effective lubrication of the reciprocating piston as well as to insure a pressure tight seal between the piston and its embracing cylinder.

Other objects and advantages of the invention, such as those relating to operating economies and efficiencies effected by means thereof, will be apparent more fully hereinafter, it being understood that said invention consists substantially in the combination, construction, location and relative arrangement of parts, all as described in detail hereinafter, as shown in the accompanying drawings and as finally pointed out in the appended claims.

In the accompanying drawings, which are illustrative of certain preferred embodiments of the present invention:

Figure 1 is a view, partly in vertical section and partly in elevation, showing an internal combustion engine constructed in accordance with and embodying the principles of the present invention;

Figure 2 is a vertical sectional view taken on the line 2—2 of Figure 1;

Figure 3 is a transverse sectional view taken on the line 3—3 of Figure 1;

Figure 4 is a somewhat enlarged view of a portion of the power cylinder shown in section in Figure 1;

Figure 5 is a transverse sectional view of a power cylinder embodying a modified form of the present invention;

Figure 6 is a vertical sectional view of a detail as taken on the line 6—6 of Figure 5;

Figure 7 is an exploded view of the several parts shown in Figure 6;

Figure 8 is a transverse sectional view of a power cylinder embodying still another modified form of the present invention; and Figure 9 is a vertical sectional view taken on the line 9—9 of Figure 8.

Referring now to the drawings and more particularly to Figures 1 to 5 thereof, it will be observed that for purposes of illustration the present invention has been shown applied to an internal combustion engine of the two-stroke cycle type having one or more power cylinders 10 in each of which is reciprocable a piston 11 fitted with a piston rod 12 slidable through a stuffing box 13 provided in the base member 14 forming the bottom wall of the power cylinder. This base member 14 serves as a support for a crosshead guide housing 15 in which are formed laterally spaced pairs of parallel guideways 16—18, the said pairs being respectively disposed upon opposite sides of the piston rod 12. The lower end of this piston rod is suitably connected to a transversely extending wrist pin suitably mounted in the upper end of the connecting rod 17, the opposite ends of the wrist pin having journalled thereon freely rotatable rollers 18—18 which travel between and are guided by the opposite pairs of guideways 16—16 in the same manner and for the same purpose as described and illustrated in my prior United States Letters Patent No. 2,064,913, granted December 22, 1936 and No. 2,171,554, granted September 5, 1939. The lower end of the connecting rod 17 is connected, as at 19, to the eccentric of the rotatably journalled crankshaft 20.

In order to provide for positive and constant lubrication of the internal wall surface of the power cylinder, each cylinder is provided in accordance with the principles of the present invention with means for applying oil in controlled amount from the crankcase directly to said internal surface of the cylinder in the zone of reciprocable movement of the piston operative within the cylinder. In one preferred arrangement of such means, the power cylinder 10 is internally lined with a pair of axially spaced sleeves 21 and 22, the space between which is fitted with an intermediate sleeve 23, all of said sleeves being of uniform gauge and diameter to provide a smooth-walled cylindrical surface within which the piston 11 is snugly fitted. The intermediate sleeve or band 23 is located substantially midway between the opposite ends of the cylinder and serves as a liner for an annular groove 24 formed in the internal surface of and extending circumferentially about the cylinder body.

As most clearly appears in Figure 3, a pair of ports 25 and 26 extend through the wall of the cylinder body into communication with the annular groove 24, said ports being respectively provided with suitable fittings 27 and 28 for connecting the groove 24 in circuit with suitable oil conducting conduits. It will be noted that the ports 25 and 26 are disposed in closely adjacent relation so that oil entering one port is forced to flow through substantially the full length of the annular groove 24 before it emerges from the other port. To insure such flow of oil through the oil groove, a plug 29 is threaded into the cylinder wall to block the groove 24 at a point intermediate the ports 25 and 26, thus effectually preventing any possibility of the oil by-passing the full length of the groove 24.

In the particular engine shown in Figure 1, a pair of power cylinders are employed each provided with its own annular oil groove 24, as just described, the grooves being connected together in series, as shown in Figure 3, by an intervening conduit 30. A conduit 31, connected to the oil outlet fitting 28 of the second cylinder, leads directly to the engine crankcase, while a conduit 32, connected to the oil intake fitting 27 of the first cylinder is in communication with the supply of oil in the crankcase through the intervention of an oil-pump (not shown). Upon operation of this pump, oil is circulated to and through the oil grooves of the power cylinders in the direction indicated by the arrows in Figure 3.

It will be obvious, of course, that the arrangement described may be employed for continuously supplying oil to and through the oil grooves of any number of power cylinders and that if the engine includes only a single power cylinder, the conduit connected to the oil outlet fitting 28, as, for example, the conduit 31, would be directly connected to the crankcase for return thereto of the crankcase oil circulated through the annular groove 24 of the cylinder.

As has already been indicated, the open face of the groove 24 formed in the wall of the cylinder body is enclosed by a cylindrical sleeve or band 23 disposed in intermediate flush relation with respect to the upper and lower lining sleeves 21 and 22. This intermediate sleeve or band is formed of a material differing in character from that of the lining sleeves in that whereas the latter are impervious to the passage of oil therethrough, the sleeve or band 23 is pervious to oil. To this latter end, the band 23 is formed of any suitable porous metal capable of permitting the seepage of oil therethrough, the band thus serving as a filter to provide a limited flow of oil from the annular groove 24 outwardly through the oil-pervious body of the band. This filter band or sleeve 23, as well as the filter discs hereinafter described, may be formed by casting the same of powdered metal in accordance with practices well-known in the metallurgy art.

Preferably, the degree of porosity of the band, that is its perviousness to the passage of oil therethrough, is such that under normal pressure of the oil supplied to the groove 24 by the oil pump the band 23 will exude only so much oil as will appear upon its inner face in the form of a thin film, this film being constantly maintained upon the internal face of the band in spite of the wiping action of the piston reciprocating within the power cylinder. Thus, as the piston reciprocates in its cylinder, the oil exuding from the face of the filter band 23 is carried to all of the internal surfaces of the cylinder in contact with the reciprocating piston, thereby providing not only adequate lubrication, but also a pressure tight seal between the interengaging cylindrical walls of the cylinder and piston.

In the modified form of the invention shown in Figures 5 to 7, the annular oil groove 24 formed in the internal surface of the cylinder wall body is enclosed by an oil-impervious cylindrical sleeve 33 tightly fitted in the cylinder and extending the full length thereof, the sleeve 33 thus replacing the separate sleeves 21 and 22 and the oil-pervious band 23 of the arrangement shown in Figure 1. Formed in the sleeve 33 approximately midway between its opposite ends are a plurality of circumferentially spaced openings 34 each of which is in communication with the annular oil groove 24. In the arrangement illustrated, four such openings 34 are provided, although their number may be varied as desired.

Integrally formed upon the outer wall of the cylinder body are a plurality of radially projecting internally threaded bosses 35, each located coaxially with respect to an opening 34 and each being removably fitted with an internally socketed closure member 35ᵃ. Disposed in each boss 35 is an oil-impervious metal disc 36, the inner surface of which is shaped to conform with the circumferential curvature of the portion of the sleeve 33 which is embraced within the confines of the boss 35. A relatively heavy coil spring 37 fitted in the socket of the closure member exerts a compressive force on the oil filter disc 36 to maintain the latter in secure position overlying the opening 34 in the sleeve 33. Thus, each of the filter discs 36 interrupt the free flow of oil from the oil groove 24 to and through the opening 34 immediately associated with each filter disc, the porosity of these discs being on the same order as that of the band 23 employed in the arrangement shown in Figure 1, whereby only a limited flow of oil is permitted through the openings 34 to the internal surface of the sleeve 33. Oil from the crankcase of the engine is supplied to the oil groove 24, as in the arrangement previously described, by means of conduits 38 and 39 respectively connected to the fittings 40 and 41 in communication with the annular groove, it being particularly observed that these fittings are disposed to either side of one of the filter disc assemblies. Although a major portion of the oil is thus free to pass directly from the inlet fitting 40 to the outlet fitting 41, nevertheless, a sufficient quantity of oil flows through substantially the full circumferential extent of the annular groove to maintain the latter at least partially filled with oil, so that under pressure of the oil pump (not shown) the desired seepage of oil through the several filter discs 36 is effected.

Figures 8 and 9 illustrate still another modification of the present invention wherein the annular oil groove previously described is dispensed with, the oil being distributed to the filter discs by a conduit 42 arranged externally of the power cylinder. As in the last described arrangement, the body of the power cylinder is internally fitted with a sleeve 43 having circumferentially spaced apertures 44 each of which is externally covered by a closely fitting oil pervious disc 45 resiliently held in position by a coiled compression spring 46 housed within the internal recess of a closure member 47 threadedly received by the boss 48 radially extending from the cylinder wall body.

In the arrangement shown in Figures 8 and 9, the several closure members 47 are each centrally apertured, as at 49, to threadedly receive the nipples of oil supply fittings 50, the outer ends of the latter being in turn connected into the external conduit 42, as at 51. The conduit 42 thus serves as a manifold to supply oil from the crankcase of the engine commonly to all of the fittings 50 and thence to the internal surface of the power cylinder by controlled seepage through the porous filter discs 45. It will be understood, of course, that any number of power cylinders of an engine may be provided with the circumferentially spaced filter disc assemblies as shown in Figures 8 and 9 and that all of said assemblies may be then supplied with oil by way of a conduit commonly connected to all of the oil supply fittings.

It will be understood that the present invention is susceptible of various changes and modifications other than those hereinbefore described without departing from the general principles or real spirit of the invention and it is accordingly intended to claim the same broadly as well as specifically as indicated in the appended claims.

What is claimed as new and useful is:

1. In an internal combustion engine, a power cylinder for a reciprocating piston, a plurality of hollow bosses projecting radially of the cylinder body and spaced circumferentially thereabout in a transverse plane traversed by said reciprocating piston, said hollow bosses being respectively in communication with the interior of said cylinder by way of oil ports spaced circumferentially about the wall of said cylinder and in respective registry with said bosses, a filter disc formed of oil-pervious material internally disposed in each boss in overlying relation with respect to its registering oil port, and means for supplying oil from a source of supply to the interior of said bosses for controlled delivery of the oil to the cylinder interior by seepage thereof through the filter discs respectively overlying said oil ports.

2. In an internal combustion engine as defined in claim 1 wherein each of said bosses is removably fitted with a closure member and wherein a coiled compression spring is interposed between said closure member and the filter disc disposed within the boss to maintain said disc in position to overlie an oil port.

3. In an internal combustion engine as defined in claim 1 wherein said last-mentioned oil-supplying means comprises an annular channel formed in the wall of the power cylinder and in common communication with the interiors of all of said bosses.

4. In an internal combustion engine as defined in claim 1 wherein said last-mentioned oil-supplying means comprises an annular channel formed in the wall of the power cylinder and in common communication with the interiors of all of said bosses, said channel being provided with oil inlet and outlet ports extending outwardly of the power cylinder and disposed, respectively, at opposite sides of one of said bosses.

5. In an internal combustion chamber as defined in claim 1 wherein said last-mentioned oil-supplying means comprises an external conduit for supplying oil commonly to the interiors of all of said bosses, said conduit providing for continuous unidirectional circulation of oil to and from its source of supply.

HARRY O. HEDGES.

REFERENCES CITED

The following references are of record in the file of this patent:

UNITED STATES PATENTS

| Number | Name | Date |
|---|---|---|
| 1,011,626 | Judson | Dec. 12, 1911 |
| 1,634,768 | Bonner | July 5, 1927 |
| 1,643,674 | Miller | Sept. 27, 1927 |
| 1,687,780 | Neale | Oct. 16, 1928 |
| 1,778,241 | Boyce | Oct. 14, 1930 |
| 2,349,203 | Spencer | May 16, 1944 |